US00RE34454E

United States Patent [19]

Yamamoto et al.

[11] E Patent Number: Re. 34,454

[45] Reissued Date of Patent: Nov. 23, 1993

[54] COPYING APPARATUS

[75] Inventors: Takemi Yamamoto; Ryohei Komiya; Naoyuki Hatta, all of Nagoya, Japan

[73] Assignee: Brother Kogyo Kabushiki Kaisha, Nagoya, Japan

[21] Appl. No.: 619,020

[22] Filed: Nov. 28, 1990

Related U.S. Patent Documents

Reissue of:

[64] Patent No.: 4,742,374
Issued: May 3, 1988
Appl. No.: 943,195
Filed: Dec. 18, 1986

[51] Int. Cl.[5] ..... G03B 27/32; G03B 27/52

[52] U.S. Cl. ..... 355/27; 430/138

[58] Field of Search ..... 355/27, 1, 315, 212, 355/66, 67, 50, 46; 271/4, 22, 139; 430/138

[56] References Cited

U.S. PATENT DOCUMENTS

| | | | |
|---|---|---|---|
| 3,001,873 | 9/1961 | Foris . | |
| 3,072,481 | 1/1963 | Berman et al. . | |
| 3,090,687 | 5/1963 | Berman . | |
| 3,116,148 | 12/1963 | Miller . | |
| 3,241,438 | 3/1966 | Frank | 355/46 X |
| 3,506,259 | 4/1970 | Caldwell et al. | 355/315 |
| 3,592,114 | 7/1971 | Minett | 355/50 X |
| 3,592,542 | 7/1971 | Kaufer et al. | 355/50 |
| 3,658,407 | 4/1972 | Kitano et al. | 355/1 X |
| 3,700,439 | 10/1972 | Phillips, Jr. . | |
| 3,792,924 | 2/1974 | Matsuda et al. | 355/3 |
| 3,947,106 | 3/1976 | Hamaguchi et al. | 355/1 |
| 3,955,888 | 5/1976 | Kakiuchi et al. | 355/1 |
| 3,981,575 | 9/1976 | Tanaka et al. | 355/1 |
| 3,982,116 | 9/1976 | Sakuma | 355/67 X |
| 3,984,183 | 10/1976 | Maksymiak | 355/315 |
| 4,212,456 | 7/1980 | Ruenzi | 271/4 |
| 4,227,687 | 10/1980 | Schoonmade | 271/139 |
| 4,289,395 | 9/1981 | Stelben | 355/315 |
| 4,353,638 | 10/1982 | Knechtel | 355/66 X |
| 4,362,378 | 12/1982 | Erskine et al. | 355/315 |
| 4,372,679 | 2/1983 | Weber | 355/70 |
| 4,394,010 | 7/1983 | Hogenson | 271/22 |
| 4,399,209 | 8/1983 | Sanders et al. | 430/138 |
| 4,424,523 | 1/1984 | Snelling et al. | 346/160 |
| 4,440,846 | 4/1984 | Sanders et al. | 430/138 |
| 4,448,516 | 5/1984 | Arney et al. | 355/27 |
| 4,483,912 | 11/1984 | Sanders | 430/138 |
| 4,501,809 | 2/1985 | Hiraishi et al. | 430/138 |
| 4,533,615 | 8/1985 | Arney et al. | 430/138 |
| 4,595,275 | 6/1986 | Sonobe | 355/1 X |
| 4,624,560 | 11/1986 | Beery | 355/27 |
| 4,630,919 | 12/1986 | Fantuzzo et al. | 355/212 X |
| 4,639,127 | 1/1987 | Beery et al. | 355/35 |
| 4,672,014 | 6/1987 | Joiner et al. | 430/20 |
| 4,714,943 | 12/1987 | Sakakibara et al. | 355/27 |
| 4,742,374 | 5/1988 | Yamamoto et al. | 355/27 |
| 4,799,085 | 1/1989 | Nagumo et al. | 355/27 |
| 4,870,444 | 9/1989 | Yamamoto et al. | 355/1 |
| 4,959,682 | 9/1990 | Yamamoto et al. | 355/27 |

FOREIGN PATENT DOCUMENTS

| | | |
|---|---|---|
| 1351499 | 5/1974 | United Kingdom . |
| 1455770 | 10/1974 | United Kingdom . |
| 1545817 | 6/1976 | United Kingdom . |
| 2029036 | 8/1979 | United Kingdom . |
| 2079962 | 7/1981 | United Kingdom . |
| 2119939 | 3/1983 | United Kingdom . |

*Primary Examiner*—Richard A. Wintercorn
*Attorney, Agent, or Firm*—Oliff & Berridge

[57] ABSTRACT

A copying apparatus including an image-illuminating device for illuminating a surface of an original having images to be reproduced, so that a light produced by the image-illuminating device is reflected by the image-bearing surface of the original. The reflected light includes rays to which a photosensitive paper is sensitive. Latent images are formed on the photosensitive paper by means of selective exposure of local portions of the photosensitive paper to the rays of the reflected light from the image-bearing surface of the original.

54 Claims, 2 Drawing Sheets

COPYING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a copying or duplicating apparatus, and more particularly to a technique for easy and economical recording or reproduction of images or information.

2. Discussion of the Prior Art

As a copying machine, there is known an image-forming apparatus, for example, an electrostatic copier that employs principles of electrostatography. This type of copying machine uses a cylindrical sensitized or photoconductive drum whose outer surface is coated with a photoconductive material such as Se, ZnO, amorphous Si or an organic semiconductor. Areas of the outer surface of the photoconductive drum which correspond to a desired image to be reproduced are exposed to light, and electrostatically charged to form a latent electrostatic image. The latent image is developed by using a toner, and the toner image is then transferred to paper. This type of copying apparatus is characterized by its capability of reproducing images at a comparatively high speed.

3. Problem Solved by the Invention

However, the conventional copying apparatus of the type indicated above employs an optical system for producing the latent images on the photoconductive drum, and therefore requires extremely tight tolerances in the out-of-roundness and dimensional errors of the drum. Accordingly, the cost of manufacture of the drum and consequently the copying apparatus is made considerably high. Further, the electrostatography requires steps of charging the photoconductive medium, developing the latent images, cleaning and erasing the latent images. Repetition of this series of steps will lead to a relatively short life expectancy of the photoconductive medium. Moreover, the apparatus must incorporate complicated devices for performing these steps. The copying machine discussed above suffers from the above drawbacks.

SUMMARY OF THE INVENTION

It is accordingly an object of the present invention to provide a copying apparatus which is simple in construction, economical to manufacture, and durable in operation.

According to the present invention, there is provided a copying apparatus comprising an image-illuminating device for illuminating a surface of an original having images to be reproduced, and a photosensitive paper. The image-illuminating device is adapted to produce a light which is reflected by the image-bearing surface of the original. The reflected light includes rays to which the photosensitive paper is sensitive. The apparatus is characterized in that latent images being formed on the photosensitive paper by means of selective local exposure of the photosensitive paper to the rays of the reflected light from the image-bearing surface of the original.

In the copying apparatus of the present invention constructed as described above, the latent images corresponding to the images on the original are readily formed on the photosensitive paper by exposing the photosensitive paper to the rays of light which have been reflected by the original and to which the photosensitive paper is sensitive. Accordingly, the instant copying apparatus is simpler in construction, more economical to manufacture, and more durable in operation, than a conventional electrostatic copying machine which uses a sensitized drum coated with a photoconductive material.

Preferably, the photosensitive paper used in the present apparatus consists of a substrate, a developer layer formed on the substrate, and a multiplicity of microcapsules formed on or embedded in the developer layer. Each microcapsule includes: a photosensitive resin curable due to polymerization upon exposure to light; a colorless chromogenic material (color former which becomes a dye) which reacts with the developer layer to form a visible image spot; and a photoinitiator for promoting the polymerization of the photosensitive material. The microcapsules may be covered with a suitable outer coating. Upon exposure to the reflected rays from the original, the photosensitive resin of the microcapsules in the exposed areas of the photosensitive paper is polymerized and thus cured, while the photosensitive resin of the microcapsules in the unexposed areas remains uncured. The latent images on the photosensitive paper are developed into the visible image in a subsequent developing process under pressure, friction or heat. That is, the cured microcapsules are not ruptured under pressure, friction or heat, but the uncured microcapsules are ruptured, whereby the chromogenic materials come out of the ruptured microcapsules and react with the developer layer, producing the visible image spots on the photosensitive paper. This type of photosensitive paper is referred to as "self-activated" type. In the case where the photosensitive or radiation-curable resin of the photosensitive paper is cured upon exposure to light, the images reproduced on the photosensitive paper are not reversed with respect to the images on the original. However, if the photosensitive paper has microcapsules whose base resin is softened or becomes brittle upon exposure to light, the reproduced images on the photosensitive paper and the images on the original are reversed to each other. In the latter case, the photosensitive resin may consist of 3-oximino-2-butanone methacrylate which undergoes main chain scission upon light exposure, or poly 4'-alkyl acylo-phenones.

According to another feature of the invention, the apparatus uses a photosensitive paper having the microcapsules on its substrate, and a separate recording paper having the developer layer on its substrate. After the photosensitive paper is exposed to the reflected light, the photosensitive paper and the recording paper are superposed in face to face contact with each other and are subjected to a developing process. In this case, the photosensitive paper is used as a transfer sheet, and is referred to as "transfer" type.

The color of the images reproduced on the photosensitive paper of the "self-activated" type or transferred from the photosensitive paper of the "transfer" type to the recording paper (developer sheet), is determined by the kind of the chromogenic material contained in the microcapsules, and is not directly influenced by the wavelength of the light to which the photosensitive resin of the microcapsules is sensitive. Therefore, the color of the original images may be different from that of the images actually reproduced. Further, the images on the original may be formed of a material which reflect rays of light having wavelengths outside the visible spectrum.

BRIEF DESCRIPTION OF THE DRAWINGS

The above and other objects, features and advantages of the present invention will be better understood by reading the following detailed description of preferred embodiments of the invention, when considered in connection with the accompanying drawings, in which.

DETAILED DESCRIPTION OF THE PREFERRED EMBODIMENTS

Figure 1:
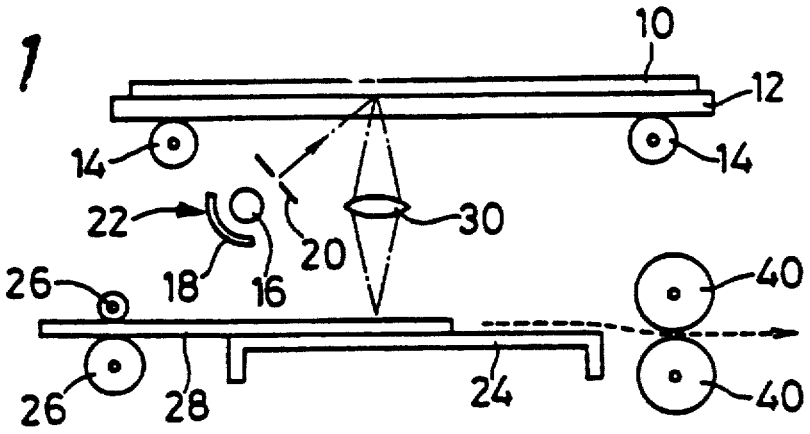
FIG. 1 is a schematic view showing a part of a copying apparatus according to one embodiment of the invention.

Referring first to FIG. 1, reference numeral 10 designates an original which has a source of information, that is, images to be reproduced, such as characters, data tables and graphs. The original 10 is placed on a transparent support plate 12 in the form of a glass sheet. This support plate 12 rests on support rollers 14 so that the support plate 12 is movable in a direction parallel to its plane and perpendicular to the axes of rotation of the rollers 14. The support rollers 14 are rotated by a suitable drive device not shown. Beneath the transparent support plate 12, there is fixedly disposed an image-illuminating device 22, which includes a light source 16, a reflector 18 and a slit-member 20 having a slit. The original 10 is placed on the support plate 12 such that the surface having the images to be reproduced is in face to face contact with the upper surface of the support plate 12. The lower image-bearing surface of the original 10 is illuminated by the image-illuminating device 22. The light source 16 consists of a rod-like light-emitting body which extends perpendicular to the direction of feed of the original 10. The light-emitting body produces a light beam which includes rays having a specific wavelength of λo. The reflector 18 extends parallel to the rod-like body of the light source 16, with a suitable distance therebetween in the radial direction of the light source 16. In this arrangement, a narrow local band on the original 10 perpendicular to its feeding direction is irradiated by a sheet of rays emitted by the image-illuminating device 22.

A table 24 is fixed a suitable distance below the transparent support plate 12, in parallel relation with each other. This table 24 is provided to slidably support a recording sheet in the form of a photosensitive paper 28. The paper 28 is fed by feed rollers 26 in synchronization with the support plate 12, and at the same speed as the plate 12. Between the support plate 12 and the table 24, there is provided an optical system including a convex lens 30, so that latent images corresponding to the images on the lower image-bearing surface of the original 10 are formed on the surface of the photosensitive paper 28 on the table 24, by exposure to the rays of light which are reflected by the surface of the original 10 and which are focused by the optical system on the surface of the paper 28. More specifically, a space between the transparent support 12 and the table 24 is enclosed by walls (not shown), so as to provide a darkroom. The above-indicated narrow local band of the original 10 to be illuminated by the image-illuminating device 22 is shifted on the original 10 as the transparent support plate 12 is moved relative to the image-illuminating device 22. The portions of the photosensitive paper 28 corresponding to the illuminated bands of the original 10 are successively exposed to the rays of light reflected by the illuminated bands as the photosensitive paper 28 is fed on the table 24. In this manner, the latent images corresponding to the images on the original 10 are formed on the photosensitive paper 28.

Figure 2:
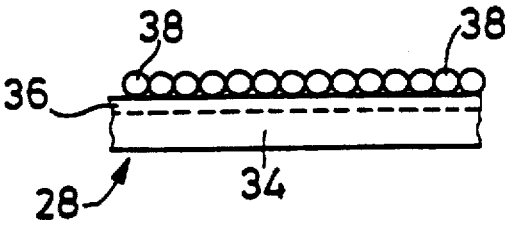
FIG. 2 is a fragmentary view of a structure of a sensitized paper used in the copying apparatus of FIG. 1.

The photosensitive paper 28 used in this embodiment is of a self-activated type which is sensitive to the reflected rays having the specific wavelength λo, and in which the unexposed portions are given a suitable color. Stated more specifically referring to FIG. 2, the photosensitive paper 28 has a substrate 34, a developer layer 36 formed on the substrate 34, and a microcapsule layer consisting of a multiplicity of microcapsules 38 each of which contains a chromogenic material and a photoinitiator for promoting polymerization of the photosensitive material. The chromogenic material is not visible to the eyes, i.e., colorless until it reacts with the developer agent in the developer layer 36, as described below. The microcapsules 38 are coated at their outer surfaces with a suitable material, as needed. Each microcapsule 38 includes a photosensitive base resin which is hardened or cured upon polymerization thereof due to exposure to the rays of the specific wavelength λo, for example, blue light, in the presence of the photoinitiator. Thus, the microcapsules 38 undergo an increase in their mechanical strength upon exposure to the rays of the specified wavelength λo. The chromogenic material included in the microcapsules 38, which is colorless or invisible in its normal state as encapsulated in the radiation-curable base resin, produces a specific color, for example, black, upon reaction with the developer layer 36. The developer layer 36 contains a developer agent which reacts with the chromogenic material in the microcapsules 38. For example, the developer agent includes various resin acids and acid clays, such as acid earth, inorganic acid or organic acid, as used for pressure-sensitive or carbonless papers. The photosensitive or radiation-curable resin of the microcapsule 38 indicated above, which is generally covered with an outer coating, and which contains the photoinitiator, may be selected from the group consisting of: an ethylenically unsaturated organic compound having at least one terminal ethylene group per molecule; an acrylate prepolymer which is derived from the partial reaction of pentaerythritol with acrylic acid or acrylic acid esters; and an isocyanate modified ester. The chromogenic material may be selected from colorless compounds, used in carbonless papers, which have in their partial skeleton a lactone, a lactam, a sultone, a spiropyran, an ester or an amido structure. More specifically, the colorless compounds may be selected from the group consisting of: triarylmethane compounds; bisphenylmethane compounds; xanthene compounds; thiazine compounds; and spiropyran compounds.

On the downstream side of the table 24 as viewed in the feeding direction of the photosensitive paper 28, there are disposed a pair of nip rollers 40. The portion of the photosensitive paper 28 which has been exposed to the reflected light is passed through a pressure nip between the rollers 40, in order to rupture the microcapsules 38 in the unexposed areas of the photosensitive paper 28. As a result of the rupture of the microcapsules 38, the chromogenic materials go out of the ruptured microcapsules 38 in the unexposed areas, and are transferred to the developer layer 36, thus reacting with the developer material in the developer layer 36, and producing a visible image spot. Thus, the nip rollers 40 constitute a developing device of the instant copying or image transfer apparatus.

The operation of the instant copying apparatus will be described.

The original 10 on the support plate 12 is fed by the drive device not shown, in one direction, i.e., in the right direction as seen in FIG. 1. At the same time, the photosensitive paper 28 is fed by the feed rollers 26, in facing relation with the original 10. With the reflected light from the original 10, the microcapsules 38 on the photosensitive paper 28 are selectively exposed, depending upon the presence or absence of the images on the original 10. In the present embodiment, the images on the original 10 are positive, and the light emitted from the image-illuminating device 22 is reflected by non-image portions on the original 10.

Figure 3:
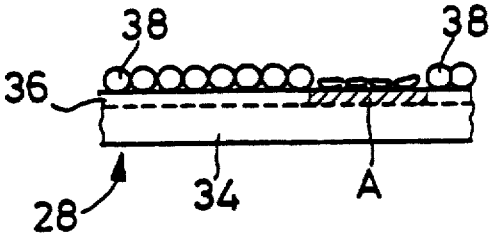
FIG. 3 is a view illustrating a state in which an image is developed on the sensitized paper of FIG. 2.

The photosensitive or radiation-curable resin of the microcapsules 38 in the exposed areas on the photosensitive paper 28 is polymerized, and thus solidified or hardened, with a result of an increase in its mechanical strength. On the other hand, the radiation-curable resin of the microcapsules 38 in the unexposed areas remains unchanged in its mechanical strength. Upon passing of the photosensitive paper 28 through the pressure nip between the nip rollers 40, 40, the capsules 38 in the unexposed areas are ruptured, whereby the chromogenic materials in the ruptured capsules 38 react with the developer layer 36, producing visible image spots, as indicated at A in FIG. 3. Thus, the images on the original 10 are reproduced on the recording paper in the form of the photosensitive paper 28. Since the resin of the microcapsules 38 in the exposed portions is hardened, permanently encapsulating the chromogenic material in the hardened resin, it is not necessary to perform an otherwise required fixing step.

As described above, the instant copying apparatus does not require a photoconductive drum having extremely high out-of-roundness and dimensional accuracy, as used in a conventional electrostatic copying machine. Further, the instant copying apparatus is simpler, less expensive, and more durable, than the electrostatic copying machine which is equipped with various devices disposed around the photoconductive drum, for various steps such as charging, developing, cleaning and erasing that are repeatedly implemented on the photoconductive drum, as previously discussed.

Figure 4:
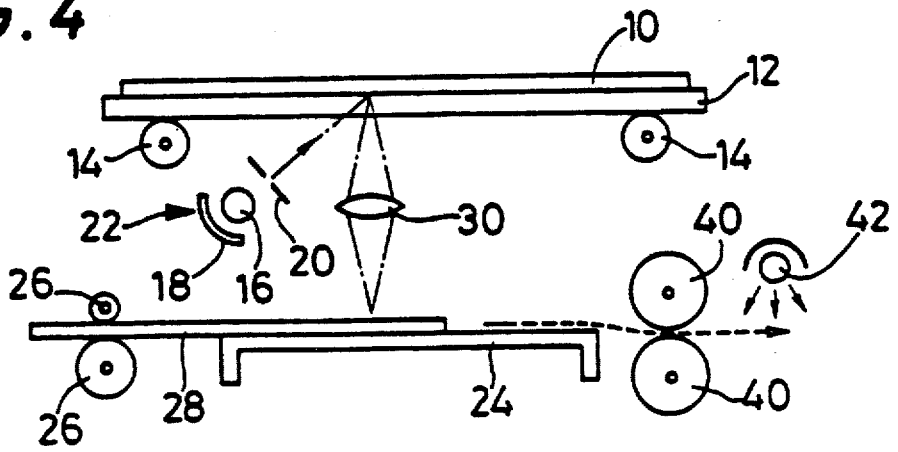
FIG. 4 is a view corresponding to that of FIG. 1, showing another embodiment of the invention.

Referring next to FIG. 4, another embodiment of the invention will be described. The same reference numerals as used in FIG. 1 are used in FIG. 4 to identify the corresponding components. In the interest of brevity and simplification, repeated description of these components will not be provided.

In the figure, there is shown an auxiliary illuminating device 42 adapted to re-illuminate the entire area of the photosensitive paper 28 after the paper 28 has passed the nip rollers 40. This auxiliary illuminating device 42 produces light which includes the rays having the wavelength $\lambda o$. The amount of light produced by this illuminating device 42 need not be so large, as compared with that of the illuminating device 22. This will be understood by the fact that the amount of the light reflected by the original 10 is one several-hundredth, while the light emitted by the auxiliary illuminating device 42 is directly incident upon the surface of the photosensitive paper 28. In this respect, the device 42 may be replaced by an arrangement which conducts part of the radiation from the primary image-illuminating device 22, to the position downstream of the nip rollers 40, by using a suitable mirror or optical fiber.

The auxiliary illuminating device 42 is provided for the following purpose. That is, it is possible that some of the uncured microcapsules 38 have not been ruptured or not been sufficiently ruptured during passage through the pressure nip of the nip rollers 40. In this case, the non-ruptured or insufficiently ruptured microcapsules 38 may cause the reproduced images on the photosensitive paper 28 to be discolored or faded. To avoid this inconvenience, the uncured or insufficiently cured resin of the microcapsules 38 is re-cured to a sufficient extent, by direct exposure to the light radiated by the auxiliary illuminating device 42. Thus, the auxiliary illumination ensures complete elimination of the otherwise possible discoloration of the reproduced images.

Figure 5:
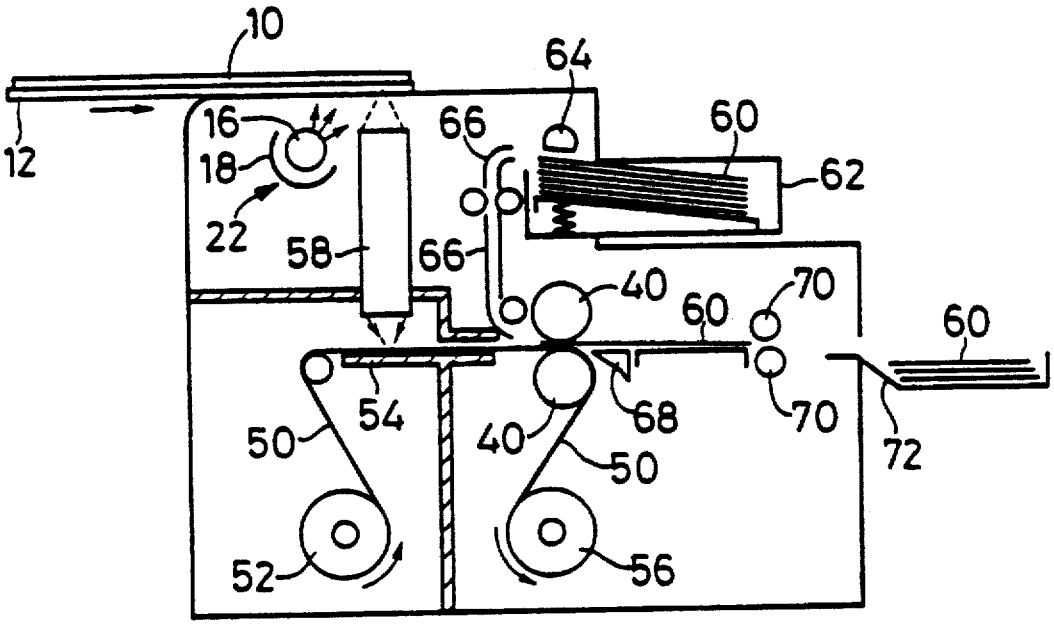
FIG. 5 is a schematic view showing a further embodiment of the invention.

Referring to FIG. 5, there is illustrated a further embodiment of the invention, wherein a photosensitive paper 50 carrying the microcapsules 38 is supplied from a feed roll 52, passed over an exposing platform 54, and eventually wound on a take-up roll 56. The portion of the photosensitive paper 50 on the exposing platform 54 is exposed to the reflected light from the original 10, which has passed through a self-focusing lens array 58. Thus, the latent images corresponding to the images on the original 10 are formed on the photosensitive paper 50. In this embodiment, however, this photosensitive paper 50 is used as an image transfer sheet, as described below.

The copying apparatus of the instant modified embodiment is equipped with a removable cassette 62 which accommodates a multiplicity of recording sheets of paper in the form of developer sheets 60 which includes the developer layer 36 as previously described. The developer sheets 60 are delivered one at a time by a feed roller 64, and guided by a guide 66 to the pressure nip of the nip rollers 40, 40, so that the developer sheet 60 as the recording sheet, and the photosensitive paper 50 as the image transfer sheet are superposed on each other, and are passed together through the pressure nip. The microcapsules 38 in the unexposed areas of the image transfer sheet 50 are ruptured under pressure of the nip rollers 40, and are transferred to the developer layer 36 of the recording sheet 60, whereby the images are transferred to the sheet 60. The image transfer sheet 50 is then separated from the recording sheet 60 by a separator 68 disposed downstream of the nip rollers 40. In the meantime, the recording sheet 60 is fed by ejection rollers 70, 70 into a tray 72.

While the present invention has been described in its preferred embodiment, the invention may be otherwise embodied.

For example, it is appreciated that the images are reproduced in a desired color on the photosensitive paper 28 or 50, by using a suitable chromogenic material or color former of the microcapsules 38.

Although the illustrated embodiments of FIGS. 1 and 4 are adapted to feed both of the original 10 and the photosensitive paper 28, it is possible that one of the originals 10 and the photosensitive paper 28 is stationary while the other is fed with the optical system.

It will be understood that various other changes, modifications and improvements may be made in the invention, without departing from the spirit of the invention defined in the following claims.

What is claimed is:

1. A copying apparatus comprising:

a photosensitive paper;

an image-illuminating device for illuminating a surface of an original having images to be reproduced, said image-illuminating device producing a light which is reflected by said surface of the original, the reflected light including rays to which said photosensitive paper is sensitive, whereby latent images are formed on said photosensitive paper by means of selective local exposure of the photosensitive paper to said rays; and an auxiliary illuminating device for re-exposing said photosensitive paper after said latent images are developed into visible images.

2. A copying apparatus according to claim 1, further comprising an optical system disposed between said original and said photosensitive paper, for focusing said reflected light on said photosensitive paper.

3. A copying apparatus according to claim 1, wherein said photosensitive paper consists of a photosensitive paper of a self-activated type which comprises a substrate, a developer layer formed on said substrate, and a multiplicity of microcapsules formed on said developer layer or embedded in said developer layer, each of said microcapsules comprising a photosensitive base resin which is curable due to polymerization thereof upon exposure to said rays of the reflected light, said each microcapsule further comprising a chromogenic material which is normally colorless and which reacts with said developer layer, and a photoinitiator for promoting the polymerization of said base resin, said chromogenic material and said photoinitiator being encapsulated within said base resin.

4. A copying apparatus according to claim [1] *7*, wherein said photosensitive paper comprises a multiplicity of microcapsules each of which includes a photosensitive base resin which is curable due to polymerization thereof upon exposure to said rays of the reflected light, said each microcapsule further [includes] *including* a chromogenic material which is normally colorless, and a photoinitiator for promoting the polymerization of said base resin, said photosensitive paper becoming an image transfer sheet after exposure to said rays of the reflected light, said image transfer sheet being placed in pressed face to face contact with [a] *said* recording paper [having a developer layer], so that said chromogenic materials of said microcapsules react with said developer layer, to produce visible images corresponding to said latent images formed on said photosensitive paper.

[5. A copying apparatus operable with an original having an image-bearing surface on which images to be reproduced are supported, comprising:

an image-illuminating device operable to produce a light for illuminating said image-bearing surface of the original;

a photosensitive paper of a self-activated type disposed in facing relation with said image-bearing surface of the original, said photosensitive paper being sensitive to rays of a wavelength included in the light reflected by said image-bearing surface;

an optical system for focusing said reflected light on a surface of said photosensitive paper, to expose local areas of the photosensitive paper, for forming latent images corresponding to said images on said original; and a developing device for developing said latent images into visible images on said photosensitive paper.]

6. A copying apparatus operable with an original in the form of a sheet having an image-bearing surface on which images to be reproduced are supported, comprising:

a transparent support plate having a top surface on which said original is placed with said image-bearing surface thereof in face to face contact with said top surface;

an image-illuminating device operable to produce a light for illuminating said image-bearing surface of the original;

a photosensitive paper of a self-activated type disposed in facing relation with said image-bearing surface of the original, said photosensitive paper being sensitive to rays included in the light reflected by said image-bearing surface;

an optical system for converging and thereby focusing said reflected light on a surface of said photosensitive paper, to expose local areas of the photosensitive paper, for forming latent images corresponding to said images on said original;

a developing device for developing said latent images into visible images on the exposed photosensitive paper; and an auxiliary illuminating device operable to produce a light for re-exposing said photosensitive paper on which said visible images have been formed.

7. A copying apparatus operable with an original in the form of a sheet having an image-bearing surface on which images to be reproduced are supported, comprising:

an image-illuminating device operable to produce a light for illuminating said image-bearing [surafce] *surface* of the original;

a photosensitive paper of a transfer type disposed in facing relation with said image-bearing surface of the original, said photosensitive paper being sensitive to rays of a wavelength included in the light reflected by said image-bearing surface;

an optical system for converging and thereby focusing said reflected light on a surface of said photosensitive paper, to expose local areas of the photosensitive paper, for forming latent images corresponding to said images on said original;

a recording paper having a developer layer; [and]

a developing device for superposing the exposed photosensitive paper and said recording paper on each other, and applying a pressure to said photosensitive paper and said recording paper toward each other, thereby developing said latent images into visible images on said recording paper*; and*

*an auxiliary illuminating device operable to produce a light for exposing said recording paper after the recording paper has passed through said developing device.*

[8. A copying apparatus according to claim 7, further comprising an auxiliary illuminating device operable to produce a light for re-exposing said photosensitive paper after the photosensitive paper has passed through said developing device.]

9. A copying apparatus according to claim [8] 7, further comprising a transparent support plate having a top surface on which said original is placed with said image-bearing surface thereof in face to face contact with said top surface.

[10. A copying apparatus comprising:

a photosensitive paper of a self-activated type which comprises a substrate, a developer layer formed on said substrate, and a multiplicity of microcapsules formed on said developer layer or embedded in said developer layer, each of said microcapsules comprising a photosensitive base resin, and a chromogenic material which reacts with said developer layer; and an image-illuminating device for illuminating a surface of an original having images to be reproduced, said image-illuminating device producing a light which is reflected by said surface of the original, the reflected light including rays to which said photosensitive base resin of said microcapsules of said photosensitive paper is sensitive, whereby latent images are formed on said photosensitive paper by means of selective exposure of said microcapsules to said rays.]

[11. A copying apparatus according to claim 10, wherein said photosensitive base resin of said each microcapsule of said photosensitive paper is curable due to polymerization thereof upon exposure to said rays of the reflected light.]

[12. A copying apparatus according to claim 11, wherein said each microcapsule further comprises a photoinitiator for promoting the polymerization of said base resin, said photoinitiator being encapsulated within said base resin.]

[13. A copying apparatus according to claim 10, wherein said chromogenic material is normally colorless, and produces visible image spots upon reaction with said developer layer.]

[14. A copying apparatus comprising:

a photosensitive paper comprising a multiplicity of microcapsules each of which includes a photosensitive base resin, and a chromogenic material encapsulated within said base resin;

a recording paper having a developer layer with which said chromogenic material of said each microcapsule is adapted to react;

an image-illuminating device for illuminating a surface of an original having images to be reproduced, said image-illuminating device producing a light which is reflected by said surface of the original, the reflected light including rays to which said photosensitive base resin of said microcapsules of said photosensitive paper is sensitive, whereby latent images are formed on said photosensitive paper by means of selective exposure of said microcapsules to said rays, so that said photosensitive paper is used as an image transfer sheet after exposure to said rays of the reflected light; and a developing device for placing said image transfer sheet in pressed face to face contact with said recording paper so that said chromogenic materials of the exposed microcapsules react with said developer layer, to produce visible images on said recording paper, said visible images corresponding to said latent images formed on said image transfer sheet.]

[15. A copying apparatus according to claim 14, wherein said photosensitive base resin of said each microcapsule of said photosensitive paper is curable due to polymerization thereof upon exposure to said rays of the reflected light.]

[16. A copying apparatus according to claim 15, wherein said each microcapsule further comprises a photoinitiator for promoting the polymerization of said base resin, said photoinitiator being encapsulated within said base resin.]

[17. A copying apparatus according to claim 14, wherein said chromogenic material is normally colorless, and produces said visible image spots upon reaction with said developer layer.]

*18. A copying apparatus operable with an original in the form of a sheet having an image-bearing surface on which images to be reproduced are supported, comprising:*

*a support plate for supporting the original;*

*an image-illuminating device operable to produce a light for illuminating said image-bearing surface of the original;*

*a photosensitive paper of a transfer type disposed in facing relation with said image-bearing surface of the original, said photosensitive paper being sensitive to rays of a wavelength included in the light reflected by said image-bearing surface;*

*an optical system for converging and thereby focusing said reflected light on a surface of said photosensitive paper, to expose local areas of the photosensitive paper, for forming latent images corresponding to said images on said original;*

*means for providing relative movement between said support plate and said light from said image-illuminating device;*

*means for feeding said photosensitive paper in synchronization with the relative movement between said support plate and said light from said image-illuminating device to form said latent images on said photosensitive paper;*

*a recording paper having a developer layer; and*

*a developing device for superposing the exposed photosensitive paper and said recording paper on each other, and applying a pressure to said photosensitive paper and said recording paper toward each other, thereby developing said latent images into visible images on said recording paper.*

*19. A copying apparatus according to claim 18, wherein said photosensitive paper is in the form of a web.*

*20. A copying apparatus according to claim 18, wherein said photosensitive paper is in the form of a cut sheet.*

*21. A copying apparatus according to claim 18, wherein said image-illuminating device comprises a light source and a slit member disposed in a light path from said light source to said optical system through the original, for causing light from a required part of an image-bearing surface of the original to be applied to said optical system.*

*22. A copying apparatus according to claim 21, wherein said slit member is disposed between said light source and the original supported by said support plate.*

*23. A copying apparatus according to claim 18, wherein said relative movement providing means moves said support plate relative to said light from said image-illuminating device.*

*24. A copying apparatus according to claim 18, further comprising an auxiliary illuminating device operable to produce a light for exposing said recording paper after said recording paper has passed through said developing device.*

*25. A copying apparatus according to claim 18, further comprising a separating device disposed downstream of said developing device in a feeding direction of said photo-*

*sensitive paper for separating said recording paper from said photosensitive paper.*

*26. A copying apparatus according to claim 18, wherein said support plate is transparent and has a surface on which said image-bearing surface of the original is placed in face to face contact with said surface, and said optical system focuses the light reflected by said image-bearing surface on a surface of the photosensitive paper.*

*27. A copying apparatus according to claim 18, wherein the application of pressure by said developing device is performed by nip rollers.*

*28. A copying apparatus according to claim 18, wherein the application of pressure to said photosensitive paper and said recording paper by said developing device is performed by a pair of opposed nip rollers.*

*29. A copying apparatus according to claim 19, wherein said recording paper is in the form of a cut sheet.*

*30. A copying apparatus operable with an original in the form of a sheet having an image-bearing surface on which images to be reproduced are supported, comprising:*

*a transparent support plate having a surface on which the original is placed with the image-bearing surface thereof in face to face contact with said surface;*

*an image-illuminating device operable to produce a light for illuminating said image-bearing surface of the original;*

*a photosensitive paper of a transfer type in the form of a web, disposed in facing relation with said image-bearing surface of the original, said photosensitive paper being sensitive to rays of a wavelength included in the light reflected by said image-bearing surface;*

*an optical system for converging and thereby focusing said reflected light on a surface of said photosensitive paper, to expose local areas of the photosensitive paper, for forming latent images corresponding to said images on said original;*

*means for providing relative movement between said transparent support plate and said light from said image-illuminating device;*

*means for feeding said photosensitive paper in synchronization with the relative movement between said transparent support plate and said light from said image-illuminating device to form said latent images corresponding to said images on said original by said reflected light;*

*a recording paper having a developer layer; and*

*a developing device for superposing the exposed photosensitive paper and said recording paper on each other, and applying a pressure to said photosensitive paper and said recording paper toward each other, thereby developing said latent images into visible images on said recording paper.*

*31. A copying apparatus operable with an original in the form of a sheet having an image-bearing surface on which images to be reproduced are supported, comprising:*

*an image-illuminating device operable to produce a light for illuminating said image-bearing surface of the original;*

*a photosensitive paper of a transfer type disposed in facing relation with said image-bearing surface of the original, said photosensitive paper being sensitive to rays of a wavelength included in the light reflected by said image-bearing surface;*

*an optical system for converging and thereby focusing said reflected light on a surface of said photosensitive paper, to expose local areas of the photosensitive paper, for forming latent images corresponding to said images on said original;*

*a recording paper having a developer layer; and*

*a developing device for superposing the exposed photosensitive paper and said recording paper on each other, and applying a pressure to said photosensitive paper and said recording paper toward each other, thereby developing said latent images into visible images on said recording paper;*

*said image-illuminating device comprising a light source and a slit member in a light path from said light source to said optical system through the original, for causing light from a required part of said image-bearing surface of the original to be applied to said optical system.*

*32. A copying apparatus operable with an original in the form of a sheet having an image-bearing surface on which images to be reproduced are supported, comprising:*

*an image-illuminating device operable to produce a light for illuminating said image-bearing surface of the original;*

*a photosensitive paper of a transfer type in the form of a web, disposed in facing relation with said image-bearing surface of the original, said photosensitive paper being sensitive to rays of a wavelength included in the light reflected by said image-bearing surface;*

*an optical system for converging and thereby focusing said reflected light on a surface of said photosensitive paper, to expose local areas of the photosensitive paper, for forming latent images corresponding to said images on said original;*

*a recording paper in the form of a cut sheet having a developer layer; and*

*a developing device for superposing the exposed photosensitive paper and said recording paper on each other, and applying a pressure to said photosensitive paper and said recording paper toward each other, thereby developing said latent images into visible images on said recording paper.*

*33. A copying apparatus operable with an original having an image-bearing surface on which images to be reproduced are supported, comprising:*

*a support plate for supporting the original;*

*an image-illuminating device operable to produce a light for illuminating said image-bearing surface of the original;*

*a photosensitive paper of a self-activated type disposed in facing relation with said image-bearing surface of the original, said photosensitive paper being sensitive to rays of a wavelength included in the light reflected by said image-bearing surface;*

*an optical system for focusing said reflected light on a surface of said photosensitive paper, to expose local areas of the photosensitive paper, for forming latent images corresponding to said images on said original;*

*means for providing relative movement between said support plate and said light from said image-illuminating device;*

*means for feeding said photosensitive paper in synchronization with the relative movement between said support plate and said light from said image-illuminating device to form said latent images on said photosensitive paper; and*

*a developing device for developing said latent images into visible images on said photosensitive paper.*

*34. A copying apparatus according to claim 33, wherein said photosensitive paper is in the form of a web.*

*35. A copying apparatus according to claim 33, wherein said photosensitive paper is in the form of a cut sheet.*

*36. A copying apparatus according to claim 33, wherein said image-illuminating device comprises a light source and a slit member disposed in a light path from said light source to said optical system through the original, for causing light from a required part of an image-bearing surface of the original to be applied to said optical system.*

*37. A copying apparatus according to claim 36, wherein said slit member is disposed between said light source and the original supported by said support plate.*

*38. A copying apparatus according to claim 33, wherein said relative movement providing means moves said support plate relative to said light from said image-illuminating device.*

*39. A copying apparatus according to claim 33, further comprising means for re-curing said photosensitive paper after said photosensitive paper has passed through said developing device.*

*40. A copying apparatus according to claim 39, wherein said re-curing means comprises an auxiliary illuminating device operable to produce a light for re-exposing said photosensitive paper after said photosensitive paper has passed through said developing device.*

*41. A copying apparatus according to claim 33, wherein said support plate is transparent and has a surface on which said image-bearing surface of the original is placed in face to face contact with said surface, and said optical system focuses the light reflected by said image-bearing surface on a surface of the photosensitive paper.*

*42. A copying apparatus according to claim 33, wherein said developing device comprises a pair of opposed nip rollers.*

*43. A copying apparatus according to claim 30, wherein said recording paper is in the form of a cut sheet.*

*44. A copying apparatus operable with an original having an image-bearing surface on which images to be reproduced are supported, comprising:*

*a transparent support plate having a surface on which the original is placed with the image-bearing surface thereof in face to face contact with said surface;*

*an image-illuminating device operable to produce a light for illuminating said image-bearing surface of the original;*

*a photosensitive paper of a self-activated type in the form of a web, disposed in facing relation with said image-bearing surface of the original, said photosensitive paper being sensitive to rays of a wavelength included in the light reflected by said image-bearing surface;*

*an optical system for focusing said reflected light on a surface of said photosensitive paper, to expose local areas of the photosensitive paper, for forming latent images corresponding to said images on said original;*

*means for providing relative movement between said transparent support plate and said light from said image-illuminating device;*

*means for feeding said photosensitive paper in synchronization with the relative movement between said transparent support plate and said light from said image-illuminating device to form said latent images corresponding to said images on said original by said reflected light; and*

*a developing device for developing said latent images into visible images on said photosensitive paper.*

*45. A copying apparatus operable with an original having an image-bearing surface on which images to be reproduced are supported, comprising:*

*an image-illuminating device operable to produce a light for illuminating said image-bearing surface of the original;*

*a photosensitive paper of a self-activated type disposed in facing relation with said image-bearing surface of the original, said photosensitive paper being sensitive to rays of a wavelength included in the light reflected by said image-bearing surface;*

*an optical system for focusing said reflected light on a surface of said photosensitive paper, to expose local areas of the photosensitive paper, for forming latent images corresponding to said images on said original; and*

*a developing device for developing said latent images into visible images on said photosensitive paper;*

*said image-illuminating device comprising a light source and a slit member in a light path from said light source to said optical system through the original, for causing light from a required part of said image-bearing surface of the original to be applied to said optical system.*

*46. A copying apparatus comprising:*

*a support plate for supporting an original;*

*a photosensitive paper;*

*an image-illuminating device for illuminating a surface of the original having images to be reproduced, said image-illuminating device producing a light which is reflected by said surface of the original, the reflected light including rays to which said photosensitive paper is sensitive, whereby latent images are formed on said photosensitive paper by means of selective local exposure of the photosensitive paper to said rays;*

*an auxiliary illuminating device for re-exposing said photosensitive paper after said latent images are developed into visible images;*

*means for providing relative movement between said support plate and said light from said image-illuminating device; and*

*means for feeding said photosensitive paper in synchronization with the relative movement between said support plate and said light from said image-illuminating device to form said latent images on said photosensitive paper.*

*47. A copying apparatus according to claim 46, wherein said photosensitive paper is in the form of a web.*

*48. A copying apparatus according to claim 46, wherein said photosensitive paper is in the form of a cut sheet.*

*49. A copying apparatus according to claim 46, wherein said image-illuminating device comprises a light source and a slit member disposed in a light path from said light source, for causing light from a required part of said surface of the original to be applied to said photosensitive paper.*

*50. A copying apparatus according to claim 49, wherein said slit member is disposed between said light source and the original supported by said support plate.*

*51. A copying apparatus according to claim 46, wherein said relative movement providing means moves said support plate relative to said light from said image-illuminating device.*

*52. A copying apparatus according to claim 46, wherein said support plate is transparent and has a surface on which said surface of the original is placed in face to face contact.*

*53. A copying apparatus comprising:*

*a photosensitive paper;*

*an image-illuminating device for illuminating a surface of an original having images to be reproduced, said image-illuminating device producing a light which is reflected by said surface of the original, the reflected light including rays to which said photosensitive paper is sensitive, whereby latent images are formed on said*

*photosensitive paper by means of selective local exposure of the photosensitive paper to said rays; and*

*an auxiliary illuminating device for re-exposing said photosensitive paper after said latent images are developed into visible images;*

*said image-illuminating device comprising a light source and a slit member in a light path from said light source for causing light from a required part of said surface of the original to be applied to said photosensitive paper.*

*54. A copying apparatus comprising:*

*a photosensitive paper in the form of a web;*

*an image-illuminating device for illuminating a surface of an original having images to be reproduced, said image-illuminating device producing a light which is reflected by said surface of the original, the reflected light including rays to which said photosensitive paper is sensitive, whereby latent images are formed on said photosensitive paper by means of selective local exposure of the photosensitive paper to said rays; and*

*an auxiliary illuminating device for re-exposing said photosensitive paper after said latent images are developed into visible images.*

* * * * *